June 16, 1936.  E. S. BLANCHARD  2,044,662
SLIDE FASTENER
Filed Feb. 19, 1935
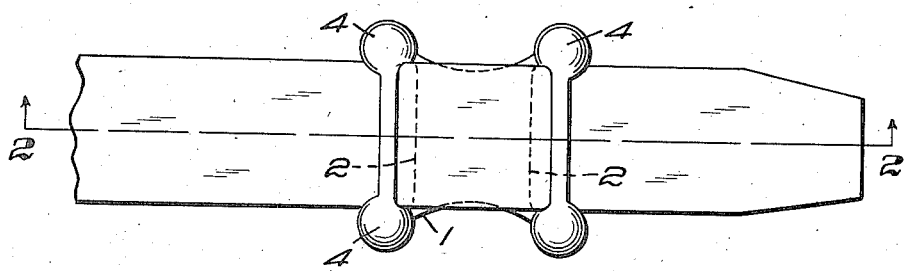
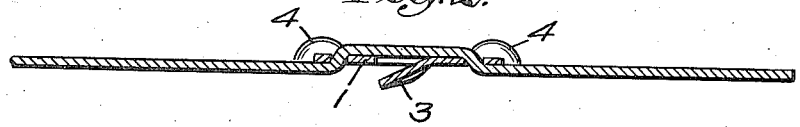
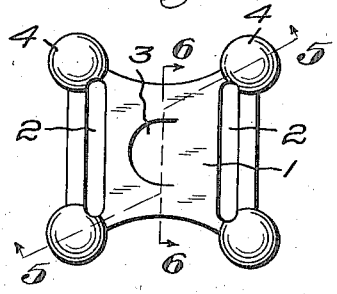 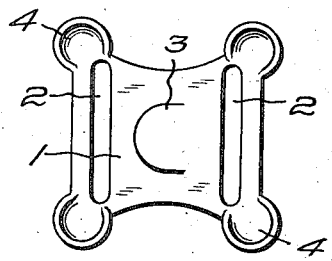
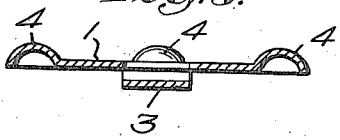 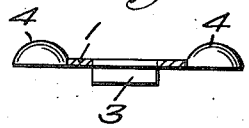
Inventor:
Edwin S. Blanchard,
by Walter S. Ives
Atty.

Patented June 16, 1936

2,044,662

UNITED STATES PATENT OFFICE 2,044,662

SLIDE FASTENER

Edwin S. Blanchard, Cambridge, Mass., assignor to United-Carr Fastener Corporation, Cambridge, Mass., a corporation of Massachusetts Application February 19, 1935, Serial No. 7,245

1 Claim. (Cl. 24—77)

My invention aims to provide improvements in separable fasteners.

In the drawing which illustrates a preferred embodiment of my invention:

Figure 1 is an elevation of my improved fastener member attached to a strap;

Fig. 2 is a longitudinal section of the strap and fastener member taken on the line 2—2 of Figure 1;

Fig. 3 is a top plan view of one form of my improved fastener member;

Fig. 4 is a bottom plan view of the fastener member;

Fig. 5 is a sectional view of the fastener taken on the line 5—5 of Fig. 3; and

Fig. 6 is a sectional view of the fastener taken on the line 6—6 of Fig. 3.

Referring to the embodiment of my invention illustrated by the drawing, I have shown a separable fastener member which has its single plate-like part made of sheet metal. The plate-like part has hollow pressed-out ornamental portions at predetermined points, and also has some sort of fastening means carried thereby for engagement with an eye member. This member is particularly though not exclusively adapted for use as one of the fastening devices for overshoes and the like. In the drawing I have shown the use of the fastener on an overshoe strap.

The plate 1 is pressed from sheet metal and is shown (Figs. 3 and 4) with two strap-receiving slots 2—2. Between the slots 2—2 I have provided a fastening means for cooperative attachment to another fastener member which is not shown. This fastening means may be a hook 3, as in Fig. 2, or any other suitable attaching means. Adjacent to the ends of said two slots there are hollow cup-shaped decorative portions 4 with the formation such as shown in Figs. 3 and 4. These four decorative hollowed portions have been pressed out of the single piece of sheet metal comprising the fastener plate 1 (Figs. 3, 4, 5 and 6).

The formation of the fastener plate and elements thereof may be varied to some extent without departing from the nature of my invention. Therefore, while I have illustrated and described in detail certain forms of my invention, I do not wish to be limited thereby, as my invention is best defined by the following claim.

I claim:

A separable fastener member, the purpose of which is to engage with another fastener member, comprising a generally rectangular-shaped plate having means for cooperative fastening engagement with said other fastener member, said plate being provided with strap-receiving slots at opposite ends thereof, and having hollow portions of the material of said member, said hollowed portions extending on the corners of the substantially rectangular-shaped plate formation beyond the limits of said rectangular-shaped plate, and said strap receiving slots extending for a substantial distance within the confines of said hollowed portions.

EDWIN S. BLANCHARD.